May 14, 1935.　　　　　L. J. BUTTOLPH　　　　　2,001,517
METHOD OF AND APPARATUS FOR STARTING ELECTRIC DISCHARGE DEVICES
Filed Oct. 24, 1931　　　　4 Sheets-Sheet 1
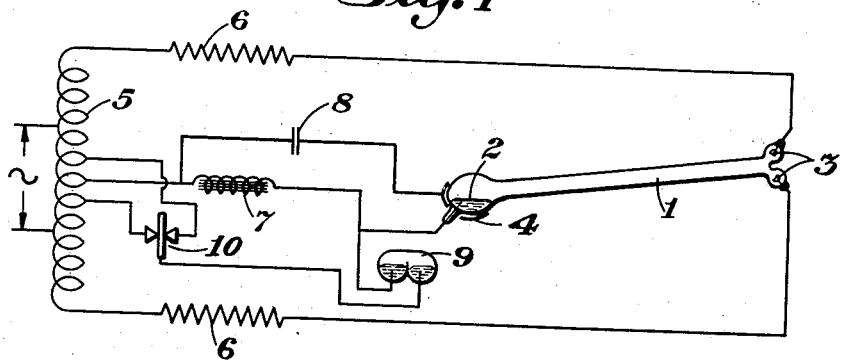
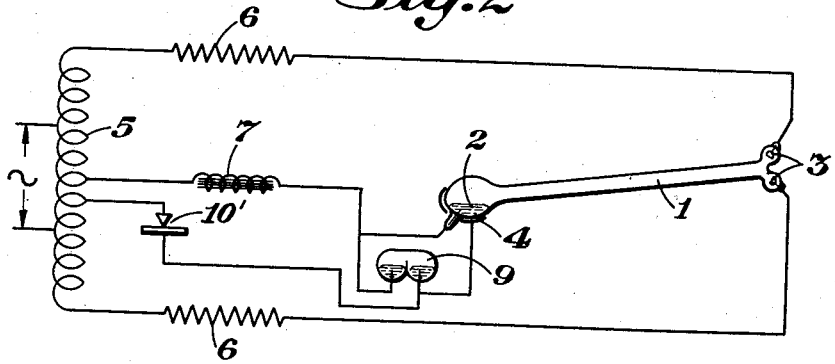
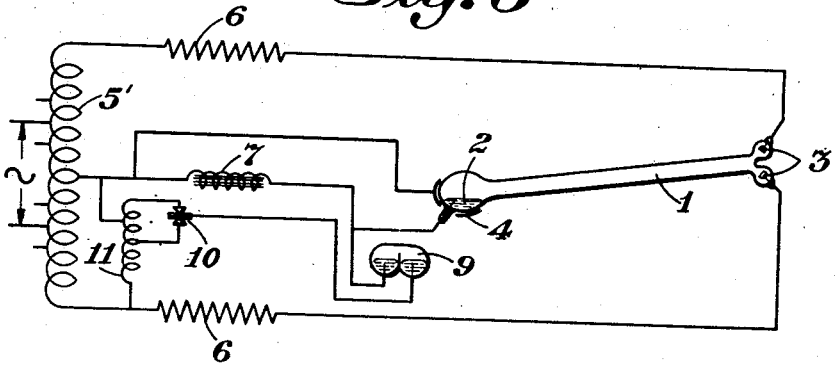
INVENTOR
Leroy J. Buttolph
BY
Thos. H. Brown
ATTORNEY

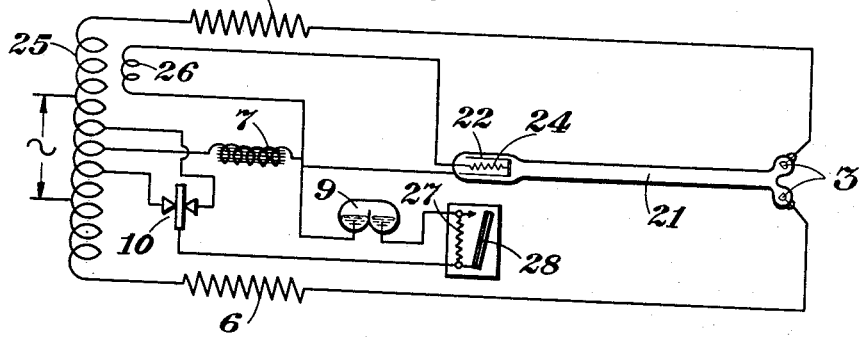
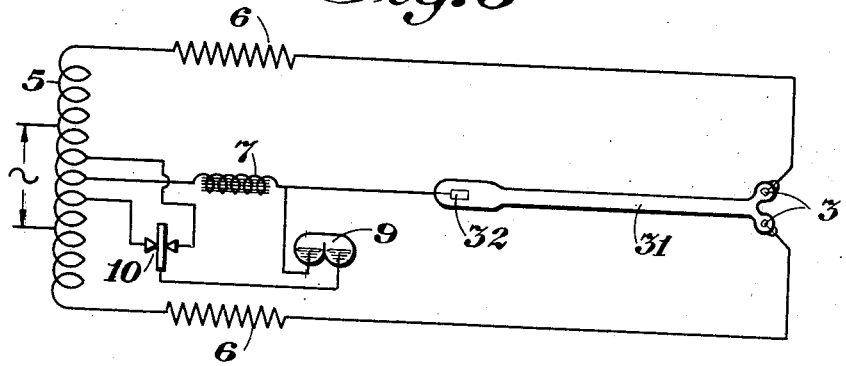
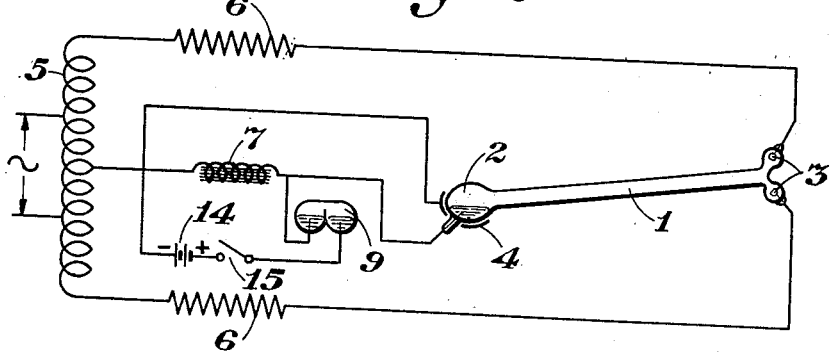

May 14, 1935. L. J. BUTTOLPH 2,001,517
METHOD OF AND APPARATUS FOR STARTING ELECTRIC DISCHARGE DEVICES
Filed Oct. 24, 1931 4 Sheets-Sheet 4
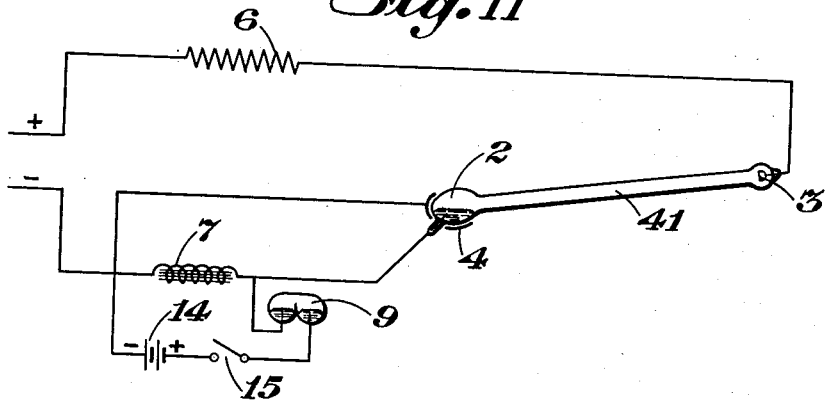
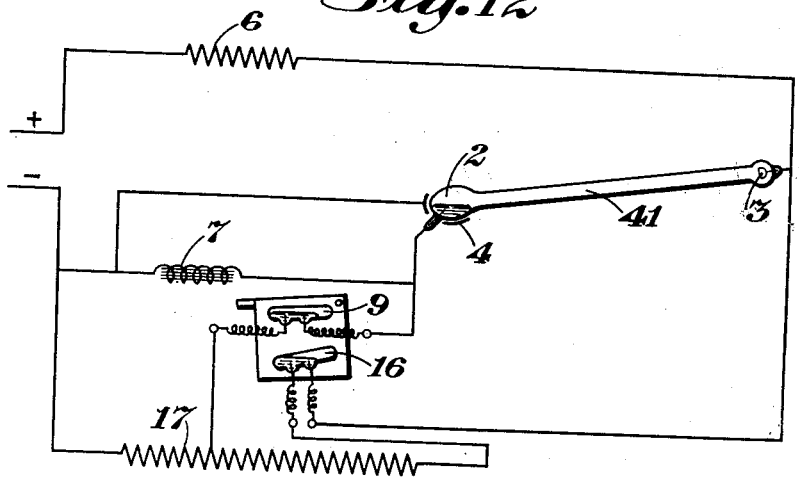
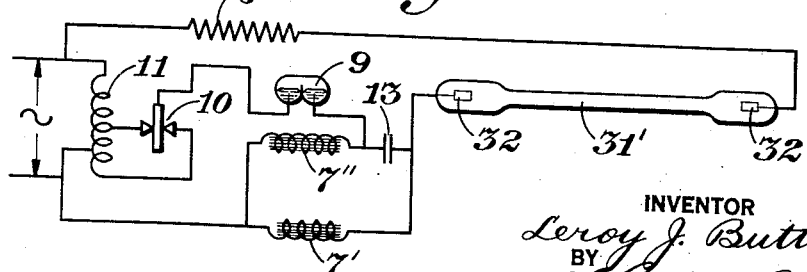
INVENTOR
Leroy J. Buttolph
BY
Thos. H. Brown
ATTORNEY Patented May 14, 1935

2,001,517

UNITED STATES PATENT OFFICE 2,001,517

METHOD OF AND APPARATUS FOR STARTING ELECTRIC DISCHARGE DEVICES

Leroy J. Buttolph, Grantwood, N. J., assignor to General Electric Vapor Lamp Company, Hoboken, N. J., a corporation of New Jersey Application October 24, 1931, Serial No. 570,959

17 Claims. (Cl. 176—45)

The present invention relates to electric gaseous discharge devices, and more particularly to apparatus capable of starting such devices into operation, and a novel method of doing the same.

A particular object of the invention is to facilitate the initiation of a discharge in electric gaseous discharge devices such as rectifiers or lamps, and especially to such devices operating on the rectifier principle. Another object of the invention is to provide an improved method of starting discharge devices of this type. Still another object of the invention is to provide a novel apparatus which will be sturdy and inexpensive and at the same time extremely effective to start discharge devices by the high voltage surge method. Other objects and advantages of the invention will appear from the following detailed description thereof, or by reference to the accompanying drawings.

The invention consists in a new and novel combination of elements, and in the novel steps of the method, as hereinafter set forth and claimed.

A well known method of initiating a discharge in gaseous electric discharge devices comprises momentarily passing current through an inductance which is connected in series with the device, and then abruptly interrupting the circuit through which this current is flowing. The ensuing voltage surge from the inductance is utilized to create an abnormal potential difference within the discharge device, by which the discharge is initiated. When the discharge devices are operated on alternating current several major difficulties are encountered in the use of this method which seriously impair the usefulness thereof. These difficulties result from the fact that the inductance is energized by full wave alternating current during this starting period. I have found that half of the time the inductance is energized in the reverse direction to that required to start a discharge in any discharge device, such as the self-rectifying type, which has a uni-directional characteristic, with the result that fifty percent of the voltage surges produced by a random interruption of the current through this inductance are entirely ineffective to initiate a discharge. Furthermore the impedance of this inductance to sixty cycle alternating current is so great that a relatively high voltage, such as 130 volts, is necessary to pass the desired magnetizing current therethrough. I have found that the use of such a voltage is undesirable since it tends to maintain a stable arc in the mercury switch, or "shifter", commonly used to interrupt this circuit, the continuation of this arc adversely affecting the starting effect, both through dissipation of the stored magnetic energy, and through the invariable delay in the final inductive surge to a time in the alternating current cycle which is unfavorable to the initiation of a discharge, both as a result of the decreased current then flowing through the inductance and as a result of the low voltage then impressed on the anodes.

I have found that all of these difficulties may be overcome by placing a rectifier in series with the inductance during the starting period. The inductance is then traversed by a uni-directional current whose pulsations are largely smoothed out by the inductance. Hence a large amount of electro-magnetic energy is stored in this inductance regardless of the time at which the circuit is interrupted by the shifter. And due to the uni-directional character of the current the impedance to current flow offered by the inductance is so reduced that a potential of the order of 3 volts is sufficient to pass the desired current therethrough. I have discovered that this low voltage is especially beneficial, since it is below the ionizing potential of mercury, so that the circuit can be interrupted between the mercury pools of the shifter without any tendency to form a stable arc. Thus the voltage surge is produced immediately after the mechanical operation of the shifter, with the result that the chance of the surge occurring at a favorable time in the anode voltage cycle is vastly increased. Moreover, as the result of my novel arrangement of apparatus every voltage surge is in the desired direction, and at least potentially effective to initiate the discharge, thus doubling the efficiency of the starting apparatus. The short duration of the unstable arc of rupture in the shifter is also beneficial for another reason. The reduced heating produced thereby vaporizes less mercury, and with the resulting lower vapor pressure the circuit is more abruptly interrupted and a higher voltage surge obtained. This again increases the effectiveness of each attempt at starting the discharge. Thus this new combination of apparatus is theoretically many times more efficient and effective than the apparatus heretofore in use to start an arc in a gaseous discharge device, and actual tests have proved this to be the case. It is, moreover, obvious that this use of a rectifier in combination with an inductance and an interrupter results in an extremely effective high potential generator which is useful in the arts generally.

From the foregoing it will be apparent that the essential feature of my invention is the use of low voltage uni-directional current to energize the inductance. While I have described the use of a rectifier as the most practical means of obtaining the desired current in an alternating current circuit I have found that other means, such as a small battery may be used with equal or greater success.

Some of the difficulties described in connection with the alternating current circuit have also been encountered in the starting of a discharge device on direct current. Here the inductance has invariably been energized by the line potential, not because this potential was necessary to overcome the impedance thereof, as in the alternating current case, but because it was the only potential available. I have discovered that the use of a low voltage is extremely beneficial in this case also, due to the destabilizing effect on the arc of rupture. I have moreover found that this low potential may be conveniently supplied either by a battery of low potential, say three volts, or by a potentiometer arrangement. When so energized my starting apparatus has proved to be many times more effective than that heretofore in use.

For the purpose of illustrating my invention I have shown several arrangements of apparatus embodying the principle thereof in the accompanying drawings, in which Fig. 1 is a schematic diagram of a preferred arrangement of starting apparatus for a mercury vapor lamp of the well known Cooper Hewitt self-rectifying type.

Figs. 2 and 3 are schematic diagrams of modifications of the circuit of Fig. 1,

Figure 5:
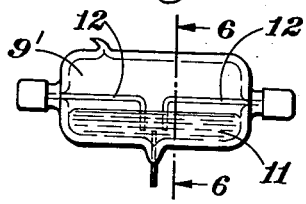
Fig. 5 is an elevational view of the shifter used in the circuit of Fig. 4.
Figure 6:
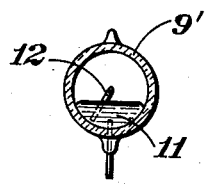
Figure 7:
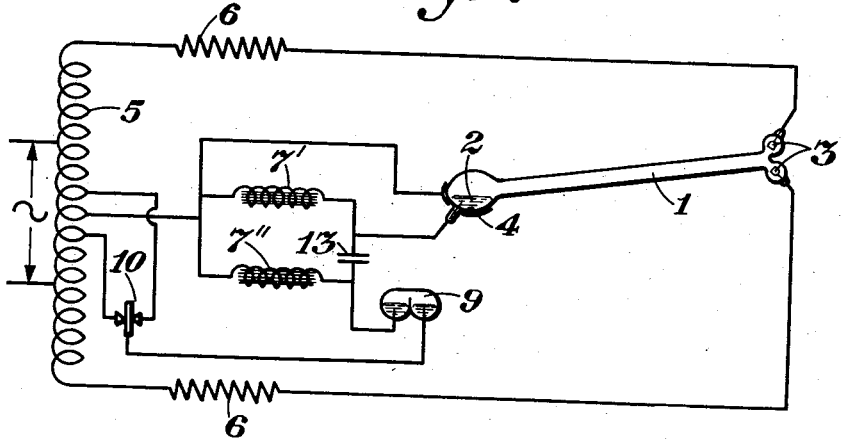

Fig. 6 is a sectional view of the same shifter, taken on the line 6—6 of Fig. 5, Fig. 7 is a schematic diagram of still another modification of the circuit of Fig. 1, Fig. 8 is a schematic diagram showing the application of my new starting apparatus to a hot cathode lamp, Fig. 9 is a schematic diagram showing the invention applied to a lamp having another type of thermionic cathode, Fig. 10 is a schematic diagram of a further modification of the circuit of Fig. 1, Fig. 11 is a schematic diagram showing my invention applied to a direct current lamp of the Cooper Hewitt type, Fig. 12 is a schematic diagram of a modification of the circuit of Fig. 11, and Fig. 13 is a schematic diagram showing the application of my invention to start a gaseous discharge device having two thermionic electrodes.

In these drawings, with special reference to Fig. 1, there is illustrated a conventional mercury vapor arc lamp 1 of the well known Cooper Hewitt type, said lamp having the usual mercury cathode 2, anodes 3 and tinfoil sheath or starting band 4. The anodes 3 are connected in a conventional manner to the ends of the autotransformer 5 through the ballast resistance 6, while the cathode 2 is similarly connected in a conventional manner to the midpoint of said transformer through an inductance 7. The mid-point of this transformer is also connected through a condenser 8 to the starting band 4. The conventional shifter 9 is connected between the cathode 2 and the negative side of a full wave rectifier 10, while the positive leads of said rectifier are connected to taps on either side of the mid-point of the autotransformer 5. The shifter 9, which is conveniently a highly evacuated mercury switch, is normally closed, but is actuated to the open circuit position in the usual manner by the inductance 7 upon energization thereof. The rectifier 10 may be of any type, but I prefer to use the copper-copper oxide type, because of its convenience and relatively low cost.

In the modification shown in Fig. 2 a half-wave rectifier 10', connected in an obvious manner, is substituted for the full wave rectifier of Fig. 1, somewhat greater voltage being applied to overcome the increased impedance of the inductance 7 to the resulting half wave pulsating current. An alternative connection for the starting band 4 is also shown, this starting band being here connected to a point in the circuit between the shifter 9 and the rectifier 10'.

The circuit shown in Fig. 3 shows the manner in which auxiliary apparatus of the type heretofore in use may be simply and inexpensively converted to provide a circuit which is the equivalent of that shown in Fig. 1. Since the autotransformer 5' used in the outfits heretofore marketed has no taps of low potential, such as the 6 or 7 volts ordinarily used, on either side of the mid-point thereof, an autotransformer 11 of small capacity is connected between one end of said autotransformer 5' and the midpoint thereof. This transformer 11 has taps of the desired potential on either side of the connection to the midpoint of said transformer 5' to which the positive leads of said rectifier 10 are connected. A further variation in this case is the direct connection of the starting band 4 to the midpoint of the autotransformer 5'. This starting band may be connected, however, as shown in Figs. 1 or 2, if desired, all of these connections being interchangeable.

Figure 4:
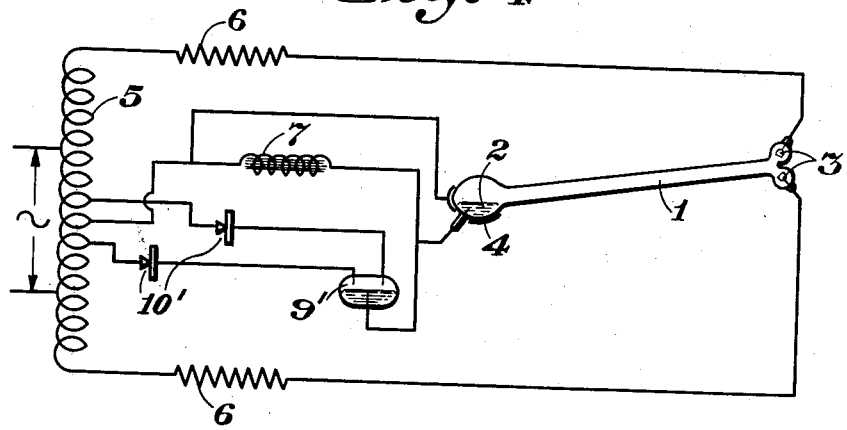
Fig. 4 is a schematic diagram of another modification of the circuit of Fig. 1, using a special type of shifter.

The circuit shown in Fig. 4 is another modification of that shown in Fig. 1. In this circuit the conventional shifter is replaced by the shifter 9', shown in some detail in Figs. 5 and 6. This shifter has a mercury pool 11, which is connected by way of a flexible lead to the cathode 2, and two inleads 12 which extend through the ends of the sealed envelope and then normally dip downwardly into said mercury pool. Said shifter 9' is adapted to be rotated in the same conventional manner as the shifter 9 of the previous figures upon energization of the inductance 7, whereupon the inleads 12 will be moved simultaneously out of contact with said mercury pool. Each of said inleads is connected in a suitable manner to the negative terminal of a half-wave rectifier 10', the positive terminals of said rectifiers being in turn connected to low voltage taps on either side of the midpoint of the autotransformer 5.

The circuit of Fig. 7 is a further modification of the circuit of Fig. 1. In this circuit the cathode 2 is connected to the midpoint of the autotransformer 5 through an inductance 7' whose reactance is made just sufficient to stabilize the discharge in the device 1. A second inductance 7", whose reactance is especially designed to give the best starting conditions, has one end connected to the midpoint of the autotransformer 5, while the other end thereof is connected to the shifter 9, and also through the condenser 13 to the cathode 2. Said condenser has sufficient capacity to pass the high voltage steep wave front surge produced when the circuit through the inductance 7" is interrupted by the shifter 9, but insufficient capacity to pass appreciable current under normal operating conditions. These inductances may obviously be wound on the same core, but in case they are wound on separate cores the shifter 9 is arranged to be operated to an open circuit position upon energization of either thereof, as, for instance, by separate armatures in the field of each of said inductances. In some cases the inductances 7' and 7" may be a single coil suitably tapped to give the same electrical characteristics.

In Fig. 8 there is shown an electric gaseous discharge device 21 of the Cooper Hewitt self-rectifying type, which is designed for use as a lamp. Said device is filled with a suitable gas or vapor, such as neon, helium, or mercury, and has a conventional thermionic cathode 22 and the anodes 3, a suitable heater 24 being provided for said cathode. The anodes 3 are connected in a conventional manner with the ends of the autotransformer 25 through the ballast resistances 6, while said cathode 22 is connected in the usual manner to the midpoint of said autotransformer through the inductance 7. A low voltage secondary coil 26 has one end connected to the heater 24, while the other end of said secondary is connected to the cathode 22, this heating circuit being completed by a connection between the heater 24 and said cathode 22 within the discharge device 21. From a point between the inductance 7 and the cathode 22 a connection is made through a shifter 9 and the resistance 27 to the negative terminal of a full wave rectifier 10, the positive terminals of said rectifier being connected to low voltage taps on either side of the midpoint of said autotransformer 25. Said resistance 27 serves as a heater for the thermostatic element 28 which upon being heated for a predetermined time short circuits the resistance 27.

Fig. 9 shows my invention applied to a discharge device having another type of thermionic cathode. In this figure the discharge device 31 contains any desired gas or vapor, such as neon, helium, or mercury. Said device has a cathode 32 which consists of a sintered mixture of a refractory material and a thermionically active material, for example a mixture of tungsten and barium oxide, such as set forth in the pending application of Pirani and Ewest, Serial No. 377,044, filed July 9, 1929; or it may consist of an oxide body in operative relation to a metallic body, as disclosed by Gaidies and Pirani in their pending application, Serial No. 447,051, filed April 24, 1930, if desired. At the opposite end of said device 31 are the anodes 3. Said cathode 32 is connected to the midpoint of the autotransformer 5, while the anodes 3 are each connected to an end of said autotransformer through the ballast resistances 6. The shifter 9 and the rectifier 10 are connected in the same manner as in the circuit of Fig. 1.

The circuit of Fig. 10 differs from that of Fig. 1 in the use of a battery in place of the rectifier 10. In this circuit a connection is made from a point between the inductance 7 and cathode 2, through the shifter 9, a suitable switch 15, and the battery 14 to the other end of said inductance. Said battery 14 may conveniently be a small 2 or 3 cell dry battery, such as commonly used in flashlights.

The circuit of Fig. 11 is similar to that of Fig. 10, and shows the use of a battery 14 in connection with a direct current discharge device 41 having the single anode 3. The connection of said battery is, of course, identical with that described in connection with Fig. 10.

The circuit shown in Fig. 12 is a variation of that of Fig. 11 in which the direct current source is made to supply the desired low voltage. In this circuit a connection is made from the anode 3 through a mercury switch 16 and a resistance 17 to the negative terminal of a suitable D. C. source. From a point between the inductance 7 and the cathode 2 a connection is made through the shifter 9 to a point of suitable potential on said resistance 17. The shifter 9 is here illustrated differently from the showing in the other figures, in order to graphically bring out the time relation of the operation of said shifter and the switch 16, but is actually identical in construction with that used in the other circuits. As shown said shifter is adjusted to open the circuit therethrough before the circuit through the switch 16 is interrupted. Since the sole function of the switch 16 is to disconnect the resistance 17, and thereby to avoid energy loss therein, any type of switch may be employed, but I prefer to use a hydrogen filled mercury switch therefor. As indicated the shifter 9 and the switch 16 are both conveniently actuated by a single armature when the inductance 7 is energized.

In the circuit shown in Fig. 13 the gaseous discharge device 31' has two thermionic cathodes 32, of the same type described in connection with the device of Fig. 9, although any other type of thermionic electrode may be used in place thereof, if desired. One of said cathodes is connected to one terminal of a suitable alternating current source through the ballast resistance 6, while the other cathode 32 is connected to the other terminal of said source through the stabilizing inductance 7'. An autotransformer 11 of small wattage, similar to that of Fig. 3, which is connected across said source of alternating current has taps of a few volts on either side of the connection which leads to said inductance 7', these taps being connected to the positive terminals of the full-wave rectifier 10. The negative terminal of said rectifier is connected through the shifter 9 and inductance 7" back to the same terminal of said source as said inductance 7'. From a point between said inductance 7" and said shifter 9 a connection is made through the condenser 13 to the same cathode 32 to which said inductance 7' is connected.

In the use and operation of the circuit of Fig. 1, upon the application of a suitable alternating current potential to the autotransformer 5 a potential is applied between the cathode 2 and the anodes 3 of the device 1, but this potential is insufficient to initiate a discharge therebetween. Current flows, however, on alternate half cycles, from the low voltage taps on either side of the midpoint of said autotransformer through the rectifier 10, thence through the shifter 9 and inductance 7 back to the midpoint of said autotransformer. The field about said inductance thereupon attracts the armature of the shifter 9, opening the circuit through said inductance, whereupon the collapsing magnetic field produces a high voltage surge. Due to the fact that this inductance is always energized by a unidirectional current, as a result of the rectifier 10 in series therewith, this voltage surge always causes the cathode 2 to be momentarily made intensely negative, say several thousand volts, with respect to the anodes. When the potential of said cathode 2 is sufficiently depressed a disruptive discharge occurs within the device, ionizing the gas, and establishing the necessary hot spot on the mercury cathode. The arc is thereupon initiated and maintained by the potential existing between the electrodes of the device 1, current flowing from first one end of the autotransformer 5 and then from the other end thereof, through one or the other of the ballast resistances 6 and anodes 3, thence through the device 1 to the cathode 2, returning through the inductance 7, which then serves to stabilize the discharge, to the midpoint of said autotransformer. The inductance 7 being thus continuously energized by the rectified arc current maintains the shifter 9 in the open circuit position.

Since the impedance of the inductance 7 is very low to the rectified current supplied thereto by the rectifier 10 during the starting interval I find that a low voltage, of the order of 3 volts, is sufficient to pass the desired current, say an ampere, through said inductance, while the additional potential required by the rectifier 10 is but a few volts. With such a low applied potential no sustained arc can be maintained in the mercury shifter, with the result that the circuit is interrupted virtually instantly. This instantaneous break is desirable for several reasons. First of all, the voltage generated by the inductance is directly dependent upon the rapidity with which the magnetic field collapses, and the low impressed voltage causes an extremely rapid opening of the circuit, with a correspondingly rapid collapse of the field. The rapidity of this collapse is, moreover, favorably affected by the fact that since less heat is generated in the shifter there is less vapor generated therein, so that the shifter is maintained in its optimum condition, and the circuit interruption is extremely abrupt. Secondly, the break is not dependent upon the cyclic fall of line voltage and shifter current, as heretofore, and hence the probability of the surge occurring at a favorable time in the cycle is vastly increased. Thirdly, due to the fact that the inductance 7 tends to smooth out the current supplied by the rectifier 10 the magnetic energy stored therein is always appreciable, with the result that an effective surge may be obtained regardless of the time during the alternating current cycle when the circuit is interrupted. This is of particular significance, since due to the phase displacement of the current in the shifter circuit with respect to the anode voltage the most favorable shifter current would otherwise closely coincide with the least favorable anode voltage. As a result of this new method of starting gaseous discharge devices I have found that these devices may be started almost instantaneously, even in the face of adverse factors, the starting action being far more effective than that of the means heretofore in use. In case the discharge is not initiated by the first action of the shifter it is obvious that the circuit through the inductance will again be automatically closed and the cycle repeated as many times as necessary.

In the simplified circuit shown in Fig. 2 the inductance 7 is energized during the starting period by the pulsating half-wave current passed by the rectifier 10'. While this circuit is not as efficient as that shown in Fig. 1 it possesses numerous advantages over the circuits heretofore employed. Since the current through this inductance is unidirectional, albeit intermittent, the impedance to the flow thereof offered by the inductance 7 is less than it would be for the unrectified current. Hence a lower voltage may be used to produce the desired current flow, this lowered voltage obviously favorably affecting the speed and the time of the current interruption in the shifter 9. In addition the shifter 9 is spared the necessity of interrupting the current when it is in the reverse direction to the required to initiate a discharge in the device 1, so that there is less heating, and consequently less vapor generated, in said shifter, with the result that the shifter can more abruptly open the circuit when the current is in the desired direction. Furthermore, since the iron of the inductance 7 is never energized in the reverse direction it is obvious that the magnetic field will be more rapidly built up therein at the beginning of each effective half cycle, so that the period during which said inductance has sufficient stored energy therein to initiate a discharge is materially increased.

The circuit of Fig. 3 is, in effect, identical with that of Fig. 1, save for the variation in the connection of the starting band 4. In this circuit the low voltage taps on the autotransformer 11, whose capacity is of the order of 10 watts, take the place of the low voltage taps provided in the autotransformer 5 of Fig. 1. As a result the shifter 9 and inductance function in the same manner as described in connection with the circuit of Fig. 1 to give the same improved starting efficiency.

In some cases it may be undesirable to leave the rectifier 10 connected to the line during operation of the device 1, due to heating effects therein. The circuit of Fig. 4 shows how this can be avoided. Two half wave rectifiers 10' are substituted for the full wave rectifier 10 of Fig. 1, and the shifter 9', illustrated in Figs. 5 and 6, is substituted for the shifter 9. Initially the circuit is, in effect, identical with that of Fig. 1, but as the shifter 9' is rotated, due to the field about the inductance 7, the inleads 12 are simultaneously rotated out of the mercury pool 11, so that the circuit through said inductance is interrupted between one or the other of said inleads 12 and said mercury pool, and at the same time the circuit through the two rectifiers in series, through which any leakage or reverse current might flow, is also interrupted, and remains open so long as a discharge is maintained in the device 1.

In each of the circuits so far discussed the inductance 7 has been used both to supply the starting surge and to stabilize the discharge once it is initiated. Hence the constants thereof have necessarily been a compromise between the ideal values for each of these purposes. The circuit of Fig. 7 is designed to eliminate this condition, which offers some handicap to the fullest realization of the benefits to be obtained with my new method of starting. In this circuit the inductance 7' serves as the arc stabilizing inductance and the value thereof may be made the ideal for that purpose, while the inductance 7" serves to provide the starting surge. Due to the low impedance offered by the inductance 7" to the rectified current supplied by the rectifier 10 this inductance may be made much larger than would be desirable, if this inductance were to be operated in series with the discharge, without increasing the voltage applied thereto to the point where a stable arc could be maintained in the shifter 9. It is thus possible to store a very much larger amount of energy in the inductance 7", which, of course, appreciably increases the probability of an arc being initiated in the device 1 upon the first operation of the shifter 9. The voltage surge produced by the inductance 7'' readily traverses the condenser 13, due to the steep wave front thereof. Upon initiation of the discharge in the device 1 the field about the inductance 7' attracts the operating armature of the shifter 9, causing said shifter to remain in the open circuit position so long as the discharge is maintained in said device. In some cases a small spark gap, such as the gaseous discharge type of lightning arrester, may be used in place of the condenser 13, such a gap offering little impedance to the high voltage surge, such a gap serving as the equivalent of the condenser.

As illustrated in Fig. 8 my invention is likewise applicable to discharge devices having a thermionic cathode. With the circuit here illustrated, upon connection of the autotransformer 25 to a suitable source of alternating current, current flows from the secondary 26 through the heater 24, thus heating the cathode 22. At the same time current flows from first one and then the other of the low voltage taps on said autotransformer 25 through the rectifier 10, resistance 27 and inductance 7 back to the midpoint of said autotransformer. This current is so limited by the resistance 27, however, that the field about said inductance 7 is insufficient to rotate the shifter 9. Said current, flowing through the resistance 27, heats the bimetallic element 28 and causes it to warp and short circuit said resistance after a time interval which is made of sufficient length to permit the cathode 22 to reach a temperature at which the free electron emission therefrom is sufficient to support the normal discharge current. When said resistance 27 is thus short circuited the current through the inductance 7 is increased, whereupon the shifter 9 is rotated and the circuit through said inductance is opened, giving rise to a voltage surge which is impressed on the cathode 22. This surge ionizes the gaseous content of the device 21, and initiates the discharge therethrough, this discharge then being maintained by the normal potential which is applied between the electrodes of said device. The discharge current passing through the inductance 7 operates in the usual manner to maintain the shifter 9 in an open circuit position during continuation of the discharge.

The device shown in Fig. 9 has a cathode which requires no preliminary heating, hence the circuit employed in this case is relatively simple, being virtually the same as shown in Fig. 1, save for the omission of the starting band and the connection thereto. The operation of this circuit is identical with that of the circuit of Fig. 1, hence a detailed description thereof is unnecessary.

In the modification shown in Fig. 10 the battery 14 replaces the rectifier 10 as a source of low voltage unidirectional current. In this circuit upon closing of the switch 15 current flows from said battery 14 through the shifter 9 and inductance 7 back to said battery. The inductance 7 is thereby energized, and causes the shifter 9 to open the circuit therethrough. The resulting voltage surge initiates the discharge in the same manner described in connection with Fig. 1, the arc being maintained by the potential supplied through the autotransformer 5. Since the battery 14 supplies a true direct current to the inductance 7 it is obvious that the effectiveness of this apparatus will be even greater than that of Fig. 1, since said inductance will be fully magnetized regardless of the time of the break in said shifter 9.

The use of the battery 14 in connection with a direct current lamp, as shown in Fig. 11, results in a considerable increase in the effectiveness of the starting surge, since it provides for the first time a voltage below the ionizing potential of mercury. Hence the shifter circuit is far more abruptly opened than has heretofore been the case, with the result that the curge applied to the cathode 2 has an unusually high potential. The operation of the circuit is similar to that of the circuit of Fig. 10 so that a detailed discussion thereof seams unnecessary.

A variation in the circuit of Fig. 11 is shown in Fig. 12. Upon application of a suitable direct current potential to this circuit current flows through the resistance 17, switch 16 and the ballast resistance 6. These resistances serve as a potentiometer to supply the desired low potential to the shifter circuit, current flowing through the branch circuit from the tap on the resistance 17 through the shifter 9 and inductance 7 back to the negative terminal of said resistance. When the shifter 9 is rotated by the field about said inductance 7 the current through said inductance is abruptly opened, resulting in the formation of a voltage surge which is impressed on the cathode 2. Since only the branch circuit is opened by the shifter 9 the full potential of the D. C. source is never impressed upon said shifter 9. It is, moreover, obvious that the relative resistances of the various parts of the circuit may be so chosen that the potential which is applied to said shifter as the circuit is opened is less than the ionizing potential of mercury. After said shifter 9 has opened the branch circuit the circuit through the switch 16 is opened, so that the energy drain through the resistance 17 is eliminated.

My invention is also useful to start into operation electric gaseous discharge devices of the double ended or symmetrical type, such as shown in Fig. 13. In this case the stabilizing inductance 7' has a relatively low value, so that the use of a separate starting inductance 7'', as shown in Fig. 7, is especially desirable since it permits the storing of a greater amount of energy. The operation of the high potential generator shown in this figure is identical with that of the generator shown in Fig. 7, and hence will not be described further. In this case the high potential steep wave front surge is impressed on the electrode 32 throught the condenser 13. It is obvious that if this electrode is at a negative potential, with respect to the other electrode 32, at the instant this surge is impressed thereon, the conditions are ideal for the initiation of a discharge in the device 31'. If the potential of these electrodes at this instant is the reverse, however, a momentary discharge occurs which ionizes the gaseous content of the device, this ionization persisting sufficiently to permit the continuation of the discharge at line potential after the surge has passed, so that the device is started into operation regardless of the relative potential of the electrodes 32. This discharge is reinitiated in a well known manner in opposite directions upon each reversal of the alternating current source, due to the persistence of ionization within the device. Should the main arc discharge fail for any reason at any time, as by momentary failure of the source of potential, it is obvious that the shifter 9 will be operated in the manner described to impress further high voltages surges on the electrode 32 until the arc discharge becomes stable. It is thus apparent that the use of a rectifier in this circuit is attended with practically all the advantages hereinbefore described as resulting from its use in the circuit of devices having a uni-directional conduction characteristic.

While I have illustrated my invention as applied to particular types of discharge devices it is to be understood that its usefulness is not limited thereto. The application of my invention to a discharge device operated on polyphase current is, for instance, fairly obvious, it being necessary in this case merely to increase the number of rectifiers. It is also to be understood that the circuits given and the mode of operation thereof, are by way of example only, and that various changes, omissions or substitutions, within the scope of the appended claims, may be made therein without departing from the spirit of my invention.

I claim as my invention:—

1. In combination, an electric gaseous discharge device having electrodes, means to apply an operating potential between said electrodes, an inductance connected to one of said electrodes, a source of uni-directional current connected across said inductance independently of said discharge device, the potential of said source being materially less than that applied between said electrodes, and means to interrupt current flow from said source through said inductance.

2. In combination, an electric gaseous discharge device having electrodes, an inductance connected to one of said electrodes, a source of uni-directional current connected across said inductance independently of said discharge device, and means to interrupt current flow from said source through said inductance, the potential of said source being insufficient to maintain a stable arc between the terminals of said current interrupting means.

3. In combination, an electric gaseous discharge device, an inductance connected to said device, a low voltage source of uni-directional current connected across said inductance independently of said discharge device, and means to interrupt current flow from said source through said inductance, said means comprising a mercury switch, the voltage of said low voltage source being less than the ionizing potential of mercury.

4. In combination, an electric gaseous discharge device having a cathode and an anode, an inductance connected to said cathode, a source of uni-directional current connected across said inductance independently of said discharge device, and means to interrupt current flow from said source through said inductance, the potential of said source being less than 100 volts.

5. In combination, an electric gaseous discharge device, having a cathode and two anodes an inductance connected to said device, means including a rectifier to pass a uni-directional current through said inductance independently of said discharge device, said rectifier having alternating current input terminals which are distinct from said anodes, and means to interrupt said uni-directional current.

6. In combination, an electric gaseous discharge device, having a cathode and two anodes an inductance connected thereto, means including a full wave rectifier to pass a uni-directional current through said inductance independently of said discharge device, said rectifier having alternating current input terminals which are distinct from said anodes, and means to interrupt said uni-directional current.

7. In combination, an electric gaseous discharge device, having a cathode and two anodes, an inductance connected thereto, means including a rectifier to pass a uni-directional current through said inductance, said rectifier having alternating current input terminals which are distinct from said anodes, means to interrupt said uni-directional current, and means to disconnect uni-directional current independent of said discharge device, said rectifier from said input terminals of the source of energy after a discharge is initiated in said device.

8. In combination, an electric gaseous discharge device, having an anode and a cathode an inductance connected to said cathode through a condenser, which blocks the flow of the normal discharge current, means to pass a uni-directional current through said inductance, and means to interrupt said current, whereby a voltage surge is produced in said inductance which is transmitted by said condenser to said cathode.

9. The method of starting a gaseous electric discharge device into operation which consists in applying between the electrodes of said device a potential which is sufficient to maintain a discharge therein but insufficient to initiate said discharge, passing current from a unidirectional source of materially lower potential than said first mentioned potential through an inductance, interrupting said current to produce a high potential surge in said inductance, and applying said high potential surge between the terminals of said discharge device to initiate a discharge therein.

10. The method of starting a gaseous electric discharge device into operation which consists in applying between the electrodes of said device a potential which is sufficient to maintain a discharge therein but insufficient to initiate said discharge, rectifying current from an alternating current source having a potential which is materially less than said discharge maintaining potential, energizing a high potential generating device with said rectified current, and applying the high potential generated by said last mentioned device between the terminals of said discharge device to initiate a discharge therein.

11. The method of starting a gaseous electric discharge device into operation which consists in applying between the electrodes of said device a potential which is sufficient to maintain a discharge therein but insufficient to initiate said discharge, rectifying current from an alternating current source having a potential which is materially less than said discharge maintaining potential, passing said rectified current through an inductance to produce an electromagnetic field, interrupting said current, availing of the collapse of said field to produce a high potential surge, and applying said high potential surge between the electrodes of said device to initiate a discharge therein.

12. A high voltage generating unit comprising an inductance, a rectifier, means to connect said inductance to a source of alternating current having a potential of less than 20 volts through said rectifier, and means to open said connection to produce a high voltage surge in said inductance.

13. A high voltage generating unit comprising an inductance, a rectifier, means to connect said inductance to a source of alternating current having a potential of less than 20 volts through said rectifier, and means to periodically open said connection to produce a series of high voltage surge in said inductance.

14. The method of generating a high potential which comprises rectifying current from an alternating current source having a potential of less than 20 volts, energizing an inductance with said rectified current to produce an electromagnetic field, interrupting the flow of said current, and availing of the collapse of said field to produce a high voltage in said inductance.

15. In combination, an electric gaseous discharge device having electrodes, an inductance connected to one of said electrodes, means to apply an operating potential between said electrodes, a battery connected across said inductance, and means to open said connection.

16. In combination, an electric gaseous discharge device having electrodes, means to apply a direct current potential between said electrodes, an inductance connected to one of said electrodes, means comprising a potentiometer arrangement to supply a reduced direct current potential across said inductance, and means to interrupt current flow from said potentiometer through said inductance.

17. In combination, an electric gaseous discharge device having electrodes, means to apply a direct current potential between said electrodes, an inductance connected to one of said electrodes, means comprising a potentiometer arrangement to supply a reduced direct current potential across said inductance, means to interrupt current flow from said potentiometer through said inductance, and means to disconnect said potentiometer after said last mentioned means has opened the circuit through said inductance.

LEROY J. BUTTOLPH.

CERTIFICATE OF CORRECTION.

Patent No. 2,001,517.  May 21, 1935.

LEROY J. BUTTOLPH.

It is hereby certified that error appears in the printed specification of the above numbered patent requiring correction as follows: Page 6, second column, line 4, claim 7, after "inductance" and before the comma insert the words independently of said discharge device; and line 8, of said claim, strike out the words and comma "independent of said discharge device,"; and that the said Letters Patent should be read with these corrections therein that the same may conform to the record of the case in the Patent Office.

Signed and sealed this 16th day of July, A. D. 1935.

(Seal)

Leslie Frazer
Acting Commissioner of Patents.